(12) United States Patent
Zhang

(10) Patent No.: US 11,325,831 B2
(45) Date of Patent: May 10, 2022

(54) CARBON NANOTUBE FOAMS WITH CONTROLLABLE ARCHITECTURE AND METHODS

(71) Applicant: FLORIDA STATE UNIVERSITY RESEARCH FOUNDATION, INC., Tallahassee, FL (US)

(72) Inventor: Mei Zhang, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 794 days.

(21) Appl. No.: 15/921,294

(22) Filed: Mar. 14, 2018

(65) Prior Publication Data
US 2018/0201508 A1     Jul. 19, 2018

Related U.S. Application Data

(60) Division of application No. 14/845,964, filed on Sep. 4, 2015, now abandoned, which is a continuation of
(Continued)

(51) Int. Cl.
*C01B 32/00*     (2017.01)
*C01B 32/168*    (2017.01)
(Continued)

(52) U.S. Cl.
CPC ............. *C01B 32/00* (2017.08); *B01J 21/185* (2013.01); *B01J 35/0026* (2013.01);
(Continued)

(58) Field of Classification Search
CPC ... C01B 32/158; C01B 32/168; C01B 32/174; C01B 32/20; C01B 32/00; B01J 21/185; B01J 35/0026; B01J 35/0033; C09K 3/32
See application file for complete search history.

(56) References Cited

U.S. PATENT DOCUMENTS

2002/0122765 A1* 9/2002 Horiuchi ................ B82Y 40/00
                                                        423/447.1
2008/0292530 A1* 11/2008 Keller ................... C01B 32/162
                                                        423/447.2
(Continued)

OTHER PUBLICATIONS

Cui et al., "Fabrication of Cross-Linked Carbon Nanotube Foam Using Polymethylmethacrylate Microspheres as Templates," J. Mater. Chem. A, 2013, 1:13984-13988.
(Continued)

*Primary Examiner* — Timothy Kennedy
*Assistant Examiner* — Olukorede Esan
(74) *Attorney, Agent, or Firm* — Eversheds Sutherland (US) LLP

(57) ABSTRACT

CNT foams and methods are provided. The methods may include forming, in a non-solvent liquid, a suspension of CNTs and particles of a pyrolytic polymer; removing the non-solvent liquid; and removing the particles of the pyrolytic polymer to produce a CNT foam having cells that at least substantially correspond to the dimensions of the particles of the pyrolytic polymer. CNT foams having porous structures also are provided.

17 Claims, 14 Drawing Sheets

Related U.S. Application Data application No. PCT/US2014/059479, filed on Oct. 7, 2014.

(60) Provisional application No. 61/887,661, filed on Oct. 7, 2013.

(51) Int. Cl.
  *C01B 32/174* (2017.01)
  *B01J 21/18* (2006.01)
  *B01J 35/00* (2006.01)
  *B01J 35/04* (2006.01)
  *B01J 35/10* (2006.01)
  *B01J 37/00* (2006.01)
  *B01J 37/08* (2006.01)
  *C09K 3/32* (2006.01)
  *C09K 5/06* (2006.01)
  *G10K 11/162* (2006.01)
  *H01B 1/04* (2006.01)
  *C01B 32/166* (2017.01)
  *C01B 32/16* (2017.01)

(52) U.S. Cl.
  CPC .......... *B01J 35/0033* (2013.01); *B01J 35/04* (2013.01); *B01J 35/1014* (2013.01); *B01J 37/0018* (2013.01); *B01J 37/084* (2013.01); *C01B 32/16* (2017.08); *C01B 32/166* (2017.08); *C01B 32/168* (2017.08); *C01B 32/174* (2017.08); *C09K 3/32* (2013.01); *C09K 5/063* (2013.01); *G10K 11/162* (2013.01); *H01B 1/04* (2013.01); *C01B 2202/22* (2013.01); *C01B 2202/32* (2013.01); *C01B 2202/34* (2013.01); *C01P 2006/10* (2013.01); *C01P 2006/12* (2013.01); *C01P 2006/16* (2013.01)

(56) References Cited

U.S. PATENT DOCUMENTS

| 2009/0131289 | A1* | 5/2009 | Zhang | D01F 9/127 |
| | | | | 508/113 |
| 2010/0187484 | A1* | 7/2010 | Worsley | C01B 32/168 |
| | | | | 252/510 |
| 2010/0189991 | A1 | 7/2010 | Lytle et al. | |
| 2011/0111177 | A1 | 5/2011 | Hata et al. | |
| 2011/0124790 | A1 | 5/2011 | Penicaud | |
| 2012/0077006 | A1 | 3/2012 | Worsley et al. | |
| 2014/0141224 | A1 | 5/2014 | Pasquali | |

OTHER PUBLICATIONS

Cui et al., "Cross-Links in Carbon Nanotube Assembly Introced by Using Polyacrylonitrile as Precursor," ACS Applied Materials & Interfaces, 2013, 5(16):8173-8178.

PCT International Search Report and Written Opinion for PCT Application No. PCT/US2014/059479 dated Jan. 14, 2015 (12 pages).

* cited by examiner

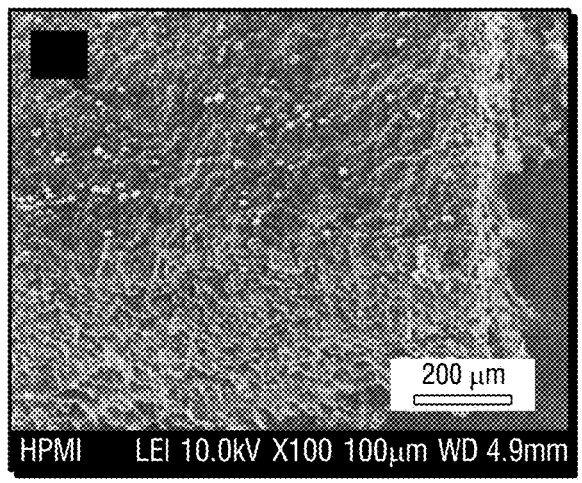 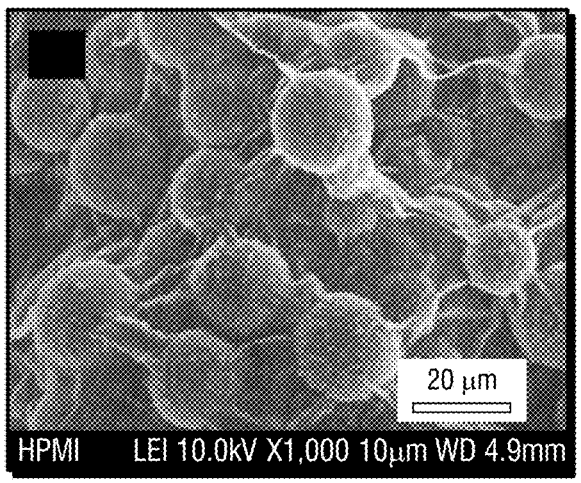
FIG. 2A  FIG. 2B
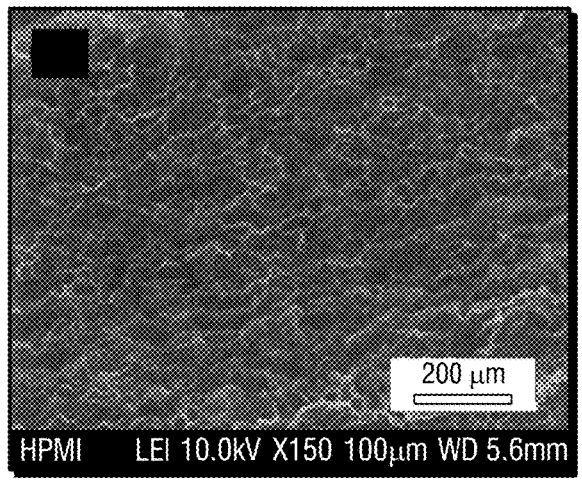 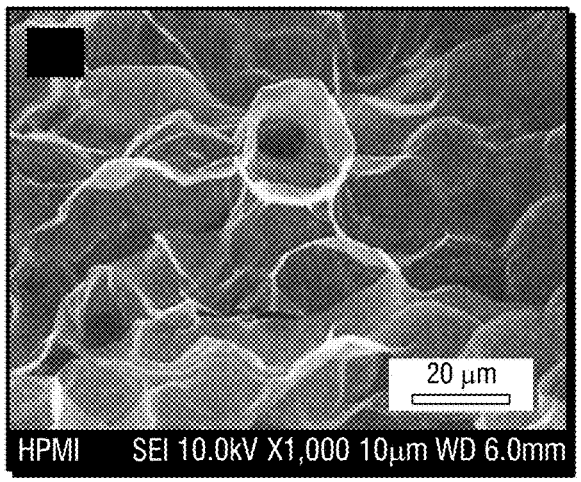
FIG. 2C  FIG. 2D

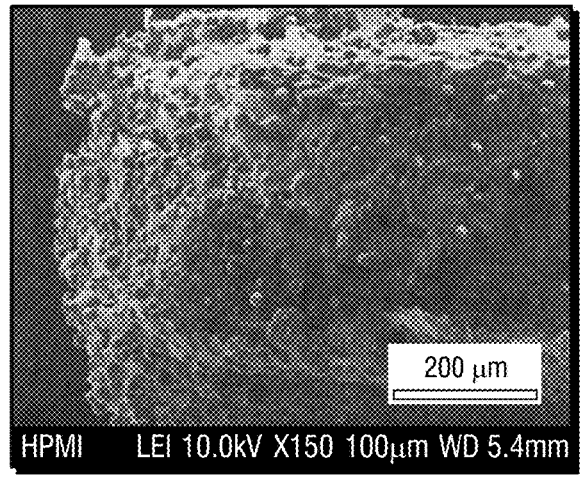
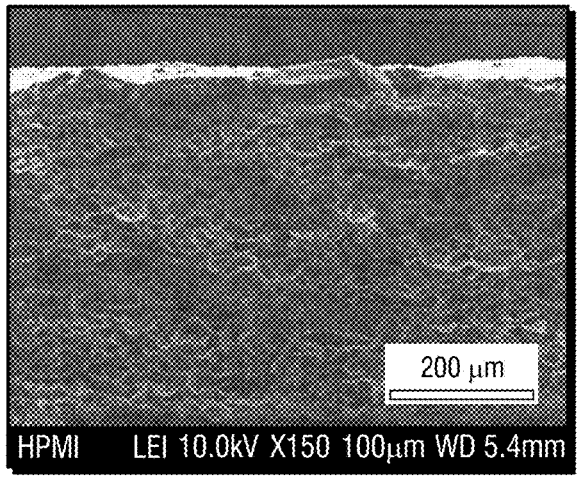
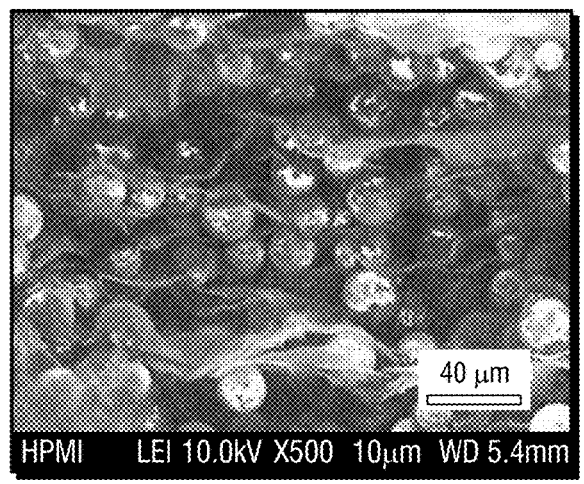
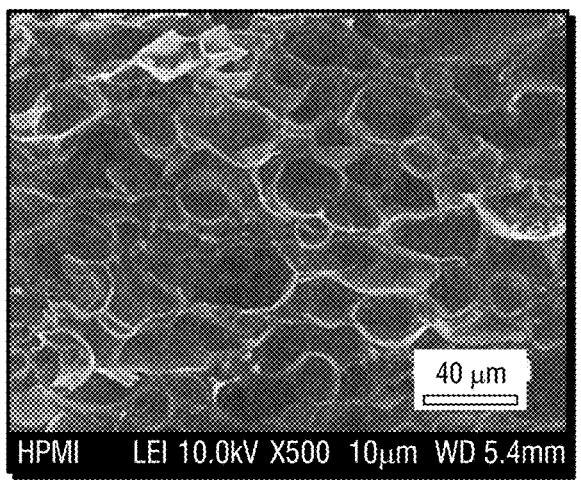
*FIG. 5A*  *FIG. 5B*

CARBON NANOTUBE FOAMS WITH CONTROLLABLE ARCHITECTURE AND METHODS

CROSS-REFERENCE TO RELATED APPLICATION

This application is a divisional of U.S. patent application Ser. No. 14/845,964, filed Sep. 4, 2015, which is a continuation of International Application No. PCT/US2014/059479, filed Oct. 7, 2014, which claims priority to U.S. Provisional Patent Application No. 61/887,661, filed Oct. 7, 2013, all of which are incorporated herein by reference.

BACKGROUND

Carbon nanotubes are useful materials having many beneficial properties. Therefore, efforts have been made to develop carbon nanotube (CNT) containing materials having different configurations. One configuration that has been tested is foam.

Although several methods have been developed for producing CNT foams, the methods suffer from one or more disadvantages. The methods for producing CNT foams that have been developed to date, include directly synthesizing foams by various techniques, including chemical vapor deposition, freeze-drying, critical-point-drying, or electrospinning. These processes, however, are either complicated, unscalable, or both.

Moreover, these processes do not afford much, if any, control over the physical characteristics of the resulting CNT foams. For example, these processes cannot controllably or predictably produce CNT foams with well-designed morphologies, including pore size, pore shape, and pore distribution. Controlling these physical characteristics, however, may permit the CNT foams to be tailored for a particular use or designed to have certain features.

Therefore, CNT foams and methods that overcome one or more of these disadvantages and/or permit control over the physical characteristics of CNT foams are desired.

BRIEF SUMMARY

CNT foams and methods are provided. In embodiments, the methods comprise forming, in a non-solvent liquid, a suspension comprising CNTs and particles of a pyrolytic polymer; removing the non-solvent liquid; and removing the particles of the pyrolytic polymer to produce a CNT foam having cells that at least substantially correspond to the dimensions of the particles of the pyrolytic polymer. In some embodiments, the methods further comprise adding a carbonaceous binder precursor to the suspension, and converting the carbonaceous binder precursor to graphitic structures.

In embodiments, the CNT foams comprise mesopores, macropores, nanopores, or a combination thereof, have a density of from about 1 to about 200 mg/cm$^3$, a BET surface area of at least 50 m$^2$/g, and a conductivity of at least 0.1 S/cm. In some embodiments, the CNT foams comprise graphitic structures.

BRIEF DESCRIPTION OF THE FIGURES

FIG. 2A is an SEM image (200 μm) of a sample containing CNTs and poly(methyl methacrylate) (PMMA) after removal of the non-solvent liquid. The weight ratio of CNTs to PMMA was 1:20.

FIG. 2B is an SEM image (20 μm) of the CNT foam of FIG. 2A at higher magnification.

FIG. 2C is an SEM image (200 μm) of the CNT foam of FIG. 2A after removal of the PMMA.

FIG. 2D is an SEM image (20 μm) of the CNT foam of FIG. 2C at higher magnification.

FIG. 5A includes SEM images of a sample, after removal of the non-solvent liquid, that includes a 2:1:20 weight ratio of polyacrylonitrile (PAN):CNT:PMMA.

FIG. 5B includes SEM images of the sample of FIG. 5A after thermal treatment at 280° C. in air.

DETAILED DESCRIPTION

Figure 1:
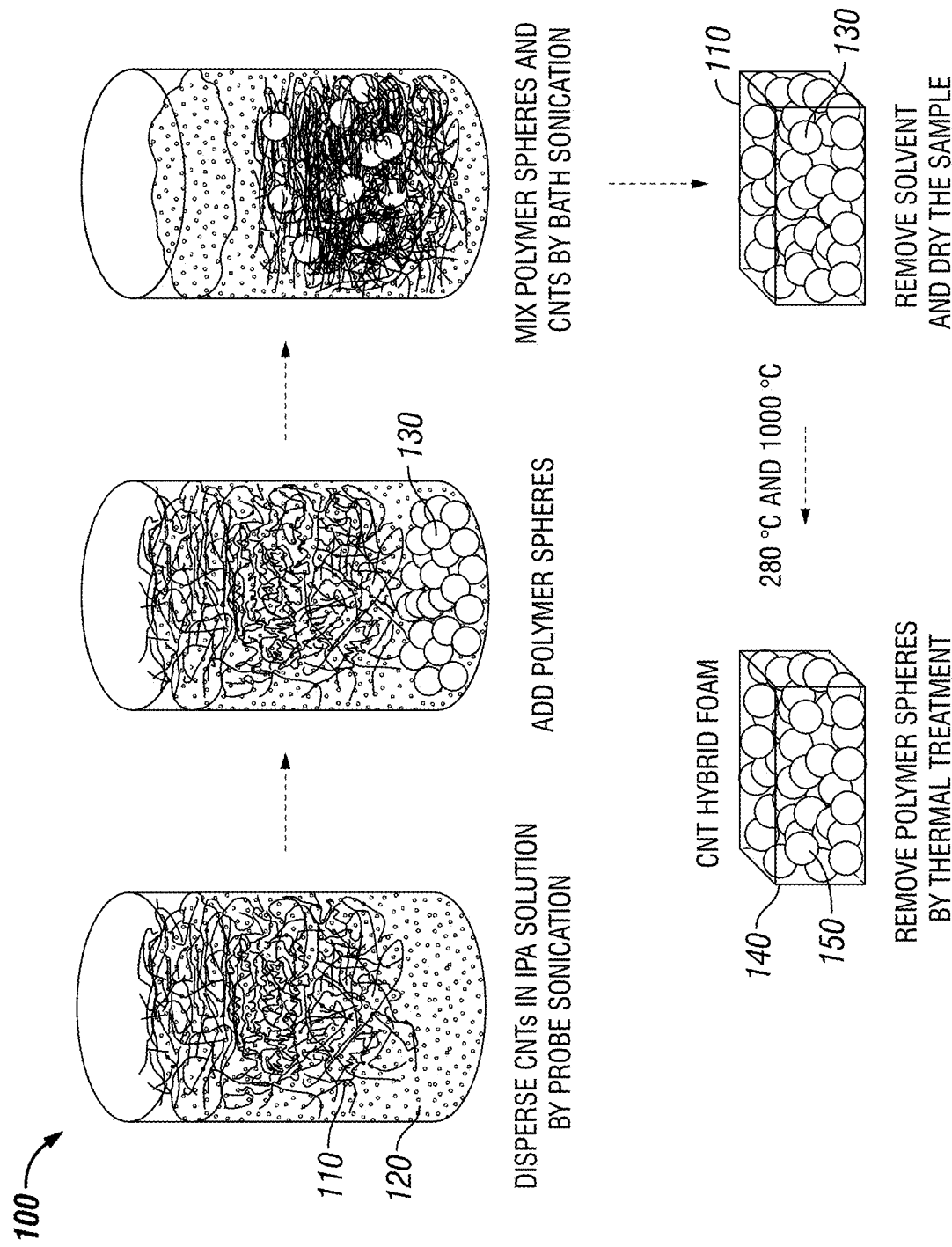
FIG. 1 is a schematic illustration of one embodiment of the methods provided herein.

CNT foams and methods for making CNT foams are provided. The methods provided herein may be used to make a CNT foam having one or more desirable features, including, but not limited to, cell shape, cell size, cell distribution, density, elasticity, conductivity, strength, modulus, toughness, and/or surface area. The CNT foams provided herein typically are solid foams, which are an important class of lightweight cellular engineering materials.

CNT Foams

CNT foams are provided herein. The structures of the CNT foams include cells. The cells of the CNT foams may be pores, including, but not limited to, mesopores, macropores, nanopores, or a combination thereof. The cells generally are areas within the CNT foams that are devoid of CNTs, or CNTs and other structural materials, such as the materials formed by heat treating a binder precursor. The cells, in some embodiments, include air or other gases. For example, in one embodiment, the CNT foam has an all carbon porous structure, wherein the cells contain air. The cells of the CNT foams also may comprise one or more solid and/or liquid additives.

The cells may be distributed evenly throughout the CNT foams. Alternatively, the cells may be distributed unevenly throughout the CNT foams. For example, a first portion of a CNT foam may have a higher density of cells than a second portion of a CNT foam. In embodiments, the cells are interconnected in at least a portion of the CNT foams. In other embodiments, the cells are open cells that are not interconnected in at least a portion of the CNTs foams.

The cells of the CNT foams may be of any shape. The cells, in some embodiments, are at least substantially spherical. The cells, in other embodiments, are substantially cylindrical. Other shapes are possible, however, including various polygonal and/or non-spherical shapes. Within a CNT foam, the cells may have substantially the same shape. Alternatively, within a CNT foam, the cells may have different shapes. For example, the different shapes may be evenly dispersed throughout a CNT foam, or the different shapes may be restricted to certain areas of the CNT foam.

The cells of the CNT foams are formed by cell walls. The cell walls may be of uniform thickness throughout the CNT foam, or, alternatively, the cell walls may have thicknesses that vary throughout a CNT foam. In embodiments, the cell walls have an average thickness of from about 0.2 to about 5 micrometers. In particular embodiments, the cell walls have an average thickness of from about 0.2 to about 2 micrometers. In further embodiments, the cell walls have an average thickness of from about 0.5 to about 2 micrometers. In some embodiments, the cell walls have an average thickness of from about 0.5 to about 1.5 micrometers. In other embodiments, the cell walls have an average thickness of about 1.0 micrometer.

The cells of the CNT foams may have any size that conforms to the overall dimensions of a particular CNT foam. The cells of a CNT foam may be uniformly sized throughout the CNT foam or portions of the CNT foam, or, alternatively, the cells of a CNT foam may be inconsistently sized throughout the CNT foam. The phrase "average cell size", as used herein, refers to the average largest dimension between the opposing cell walls that make up a cell. The average cell size of the CNT foams, in embodiments, is from about 2 to about 100 micrometers. The average cell size of the CNT foams, in other embodiments, is from about 5 to about 50 micrometers. The average cell size of the CNT foams, in some embodiments, is from about 10 to about 40 micrometers. The average cell size of the CNT foams, in other embodiments, is from about 20 to about 30 micrometers.

Generally, the CNTs of the CNT foams may include single-walled carbon nanotubes, multi-walled carbon nanotubes, carbon nanofibers, or a combination thereof. In one embodiment, the CNTs are multi-walled nanotubes (MWNTs). In another embodiment, the CNTs are MWNTs produced by catalytic thermal chemical vapor deposition that are 400-500 nanometers long, have 4-6 walls, and an average diameter of 8 nanometers. The average diameter of the CNTs may range from 1 nm to 99 nm.

In embodiments, the length of the CNTs used to make the CNT foams is at least two times the average cell size of the CNT foam. In some embodiments, the length of the CNTs used to make the CNT foams is at least five times the average cell size of the CNT foam. In other embodiments, the length of the CNTs used to make the CNT foams is at least ten times the average cell size of the CNT foam. In further embodiments, the length of the CNTs used to make the CNT foams is at least fifteen times the average cell size of the CNT foam. Not wishing to be bound by any particular theory, it is believed that selecting the length of the CNTs based on the average cell size of the CNT foam allows the adjacent cells to be connected by CNTs, thereby improving the integrity of the CNT foam structure. The average cell size of the CNTs may be correlated, as explained herein, to the characteristics of the CNTs used to make the CNT foams to enhance the integrity or other characteristics of the CNT foams.

The density of the CNT foams may be adjusted by altering the methods provided herein. For example, the cell size and cell distribution may correlate with the resulting density of a CNT foam. The density of the CNT foam, in some embodiments, is from about 1 to about 200 mg/cm$^3$. The density of the CNT foam, in other embodiments, is from about 20 to about 150 mg/cm$^3$. The density of the CNT foam, in further embodiments, is from about 20 to about 100 mg/cm$^3$.

The BET (Brunauer-Emmett-Teller) surface area of the CNT foams, in embodiments, is higher than 50 m$^2$/g. The BET surface area of the CNT foams, in other embodiments, is higher than 100 m$^2$/g. The BET surface area of the CNT foams, in some embodiments, is higher than 150 m$^2$/g. The BET surface area of the CNT foams, in further embodiments, is higher than 200 m$^2$/g.

The conductivity of the CNT foams may be adjusted using the methods provided herein, and/or by altering the materials used to make the CNT foams. The conductivity, in embodiments, is higher than 0.05 S/cm. The conductivity, in some embodiments, is higher than 0.1 S/cm. The conductivity, in other embodiments, is higher than 0.15 S/cm.

The CNT foams may include graphitic structures, which may be provided by a carbonaceous binder precursor, as described herein. The graphitic structures may create cross-links among CNTs of the CNT foams, thereby reinforcing the CNT foams, improving the conductivity of the CNT foams, and/or increasing the surface area of the CNT foams. The graphitic structures may include graphene and/or graphene flakes. The phrase "CNT/graphene hybrid foam", as used herein, indicates CNT foams that include graphitic structures.

Generally, the CNT foams may include other nanoscale or microscale thermally stable fibers. The other nanoscale or microscale thermally stable fibers may be dispersed throughout at least a portion of the CNT foam, disposed on at least a portion of the surface of the CNT foam, or both. Non-limiting examples of other fibers include carbon fiber, quartz wool, and metal wires.

Not wishing to be bound by any particular theory, it is believed that adding certain amounts of other fibers can tune the properties of the CNTs foams. For example, the other fibers may increase the stiffness without significantly impacting elasticity, and/or the other fibers may improve the conductivity, density, or other characteristics of the CNT foams. The other fibers may permit tuning of the density and total surface area of the CNT foams. In embodiments, the other fibers are present in the CNT foams in a ratio of CNTs to the other fibers of from about 1:0.1 to about 1:1. Similar ratios of thermally stable particles in sub-micro scale also may be added to tune the properties of the foam.

The CNT foams described herein are very strong and extremely elastic, i.e., bouncing back after being compressed, in some embodiments. In some embodiments, the CNT foams described herein are electrically conductive and/or chemical-resistant. In addition to these properties, the CNT foams, in particular embodiments, have a light weight and a high surface area.

Methods for Making CNT Foams

Methods are provided for fabricating CNT foams. The methods provided herein can be used to fabricate CNT foams with one or more desirable features. The controllable features of the CNT foams may include, but are not limited to, cell shape, cell size, cell distribution. By controlling these features CNT foams may be produced having a desirable density, porosity, elasticity, conductivity, strength, modulus, toughness, and/or surface area.

In embodiments, the methods include (1) forming, in a non-solvent liquid, a suspension comprising CNTs and a pyrolytic polymer; (2) removing the non-solvent liquid, and (3) removing the pyrolytic polymer. In embodiments, forming a suspension comprises (i) dispersing CNTs in the non-solvent liquid to form a CNT suspension, and (ii) adding a pyrolytic polymer to the CNT suspension.

In one embodiment, the method comprises (1) dispersing CNTs in a non-solvent liquid by using probe sonication to form a CNT suspension, (2) adding a pyrolytic polymer to the CNT suspension and sonicating the mixture to achieve a uniform dispersion of polymer in the CNT suspension, (3) using vacuum filtration to obtain a solid CNT/polymer composite, and (4) obtaining a CNT foam by removing the polymer from the sample by heat treatment of the sample at a temperature higher than the pyrolysis temperature of the polymer in air or under an inert gas for a suitable time.

The suspension may be formed by means known in the art, such as by stirring. Sonication or other suitable agitation means known in the art may be used to assist with the formation of the suspension and/or uniformly dispersing the pyrolytic polymer and CNTs in the suspension. In one embodiment, the sonication lasts at least 5 minutes. Generally any non-solvent liquid may be used that meets the following conditions: (1) wets CNTs but does not damage CNTs, and (2) does not dissolve the pyrolytic polymer. Non-limiting examples of non-solvent liquids include isopropyl alcohol (IPA), ethanol, methanol, or a combination thereof. In some embodiments, the non-solvent liquid may be water or an aqueous solution.

Removing the non-solvent liquid may be achieved by means known in the art. For example, evaporation, filtration, including vacuum filtration, and/or sedimentation or other gravity-assisted separation processes may be used to remove the non-solvent liquid. After the non-solvent liquid has been substantially removed, the sample may be dried by means known in the art, e.g., with or without heating or vacuum assistance using conventional dryers or other equipment.

Removing the pyrolytic polymer may be achieved by means known in the art. For example, heat treatment, e.g., in a kiln or other suitable heating or reactor vessel, may be used to remove the pyrolytic polymer. The heat treatment may be performed at a temperature that causes the pyrolytic polymer to pyrolyze and evaporate. The heat treatment may be performed at a temperature of from about 250° C. to about 1,000° C. The heat treatment may be performed under air or an inert atmosphere, such as $N_2$.

Generally, any pyrolytic polymer may be used in the methods provided herein. In some embodiments, the pyrolytic polymers are thermoplastic polymers, which pyrolyze and fully evaporate at elevated temperatures without having residuals. Non-limiting examples of pyrolytic polymers include poly(methyl methacrylate)(PMMA), nylon, polyesters, or a combination thereof.

Typically, the pyrolytic polymer is a powder or other particulate form of a selected size and shape. The cells of the CNT foam are formed at the site of the pyrolytic polymer as it is removed from the CNTs; therefore, the cells of the CNT foams have the same or similar size and shape as the pyrolytic polymer particles. Therefore, the characteristics of the pyrolytic polymer can be used to control the characteristics of the cells in the CNT foams, because the pyrolytic polymer may act as a template for the cells of the CNT foams. The CNTs typically form networks around the polymers, and the CNT networks eventually form the cell walls.

The particles of pyrolytic polymer may be, at least substantially, spherical, rectangular, triangular, irregularly shaped, or a combination thereof. The particles also may be shaped like a disk, a rod, or a fiber. The average diameters of the pyrolytic polymer particles may range from tens of nanometers to hundreds of micrometers. The average diameter of the pyrolytic polymer particles, in embodiments, is from about 100 nm to about 1,000 micrometers. The average diameter of the pyrolytic polymer particles, in further embodiments, is from about 100 nm to about 1,000 micrometers. The average diameter of the pyrolytic polymer particles, in some embodiments, is from about 100 nm to about 500 micrometers. For a particular foam, pyrolytic polymer particles having a range of average diameters may be used. This range may be narrow, wide, or with certain ratios of different sizes. Moreover, different shapes of pyrolytic polymer particles may be combined. As used herein, the phrase "average diameter" as it relates to the pyrolytic polymer is not intended to convey that the pyrolytic polymer is necessarily spherical or substantially spherical; instead, the "average diameter" refers to the largest average dimension of the particular shape of pyrolytic polymer particles being used.

For example, if the pyrolytic polymer is spherical, then "average diameter" relates to the diameters of the spheres, but if the pyrolytic polymer is rod-shaped, then the "average diameter" relates to the largest dimension, i.e., length, of the rod.

Generally, the amount of pyrolytic polymer used to make the CNT foams may be selected to produce a CNT foam having one or more desirable characteristics. In the processes provided herein, the weight ratio of the pyrolytic polymer to CNTs, in embodiments, is from about 1:1 to about 60:1. In embodiments, the weight ratio of the pyrolytic polymer to CNTs of the suspension is from about 10:1 to about 50:1. In some embodiments, the weight ratio of the pyrolytic polymer to CNTs of the suspension is from about 10:1 to about 40:1. Not wishing to be bound by any particular theory, it is believed that increasing the weight percentage of pyrolytic polymer relative to the CNTs produces CNT foams having lower densities and higher cell volume.

In embodiments, the methods comprise adding a binder precursor to the suspension. The binder precursor, in embodiments, is a carbonaceous binder precursor. The carbonaceous binder precursor may be converted to graphitic structures. The graphitic structures may be formed by heat treatment. In one embodiment, removing the pyrolytic polymer comprises a heat treatment that removes the pyrolytic polymer and converts the carbonaceous binder precursor to graphitic structures. In another embodiment, the methods provided herein comprise subjecting the CNT foams to further heat treatment after the pyrolytic polymer has been removed. The further heat treatment may convert the carbonaceous binder precursor to graphitic structures. The binder precursor may be combined with a solvent before it is added to the suspension, for example dimethylformamide (DMF), which is suitable for polyacrylonitrile. Solvents other than DMF can be used so long as the solvent dissolves the binder precursor, but not CNTs. Regarding the pyrolytic polymer, the solvent should either not dissolve the pyrolytic polymer or dissolve such an insignificant portion of the pyrolytic polymer that the shape of the pyrolytic particles is not substantially altered.

The further heat treatment, in embodiments, comprises heating the CNT foam to at least 800° C. In one embodiment, the further heat treatment comprises two steps: first, heating the CNT foam to a temperature of from about 200 to about 300° C. to stabilize the carbonaceous binder precursor, and second, heating the CNT foam to at least about 800° C. for a time sufficient to convert the carbonaceous binder precursor to graphitic structures. The further heat treatment may be performed in air or under an inert gas, such as $N_2$. In one embodiment, the further heat treatment is performed in air when the temperature is lower than 400° C., and under an inert gas when the temperature is higher than 450° C.

Generally, any carbonaceous binder precursor may be used in the methods provided herein. Non-limiting examples of carbonaceous binder precursors that may be used in the methods provided herein include polyacrylonitrile (PAN) and pitch. These substances can be carbonized to form graphitic structures (including graphene and graphene flakes) among CNTs and around CNTs, which may result in the reinforcement of CNT networks, improvement of conductivity, and an increase of surface area of the CNT foams.

The weight ratio of binder precursor to CNTs in the CNT foams may range from about 0.1:1 to about 10:1. In embodiments, the weight ratio of binder precursor to CNTs in the CNT foams ranges from about 0.1:1 to about 5:1. In one embodiment, the weight ratio of binder precursor to CNTs in the CNT foams is about 2:1. In another embodiment, the weight ratio of binder precursor to CNTs in the CNT foams is about 0.5:1. Not wishing to be bound by any particular theory, it is believed that a relatively lower addition of binder precursor leads to the formation of cross-links among the CNTs of the CNT foams, while a relatively higher addition of binder precursor also leads to the formation of graphene flakes around the CNTs of the CNT foams.

Therefore, in some embodiments, two different polymers may be used in the processes provided herein. One polymer may be a pyrolytic polymer, which serves as a template for creating cells of the CNT foams, and the second polymer may be a carbonaceous binder precursor, which may act as a reinforcement agent for creating crosslinks among CNTs and graphitic structures around CNTs. The methods provided herein, as a result, may be used to create CNT foams having a controlled porosity and structural integrity by adjusting the concentration of pyrolytic polymer particles and their size as well as the amount of carbonaceous binder precursors.

Using the methods here, the CNT foams can be produced with controllable and tunable morphology, cell shape, cell volume, and distribution of cells. For example, the CNT foams can be produced having density gradients, cell size gradients, or a combination thereof. The methods provided herein allow one to engineer the porosity of the foam, which can broaden the number of applications in which the foams can be used. It is believed that due to the conductivity, high surface area, low density, and integration of micropores and nanotubes, the CNT foams may have a wide number of potential applications in a variety of areas, such as catalyst support, energy absorption, separation, chemical reactor, sensor, medicine, and solar cells. Moreover, the pores of the CNT foams can be filled with other functional materials to form novel structures for other applications.

The CNT foams provided herein may be used in a number of fields. For example, the CNT foams disclosed herein could be used in batteries and thermoelectric devices because the high surface areas may be useful in achieving supercapacities. The CNT foams may be useful in absorbing energy and dampening vibrations for a variety of machinery. The CNT foams may be able to absorb up to 900 times their own weight in oil and do so quickly, making them attractive for cleaning oil spills. The CNT foams may be used as a 3D conductive scaffold for bioengineering. Compared with conventional foams, CNT foams provided herein have the potential to offer additional advantages such as mechanical flexibility and robustness, electrical conductivity, thermal stability, and resistance to harsh environments, and have the potential to impact a broad range of applications, such as multifunctional structural media, sensors, high strength to weight ratio composites, membranes, and electrodes. The CNT foams also may have the potential to serve as a phase change energy storage material, catalytic carrier, or efficient composite.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1-Preparation of CNT Foam

The CNTs used in this example were chemical vapor deposition produced multi-walled CNTs with 4-6 walls, ~8 nm in diameter, and ~500 μm in length. The CNTs were dispersed in isopropyl alcohol (IPA) and sonicated. A pyrolytic polymer—poly(methyl methacrylate)(PMMA)—was then added to the CNT suspension (20:1 weight ratio of PMMA/CNT). The PMMA was in the form of microspheres having a diameter of 5-27 micrometers. The IPA was removed with vacuum filtration.

Figure 3A:
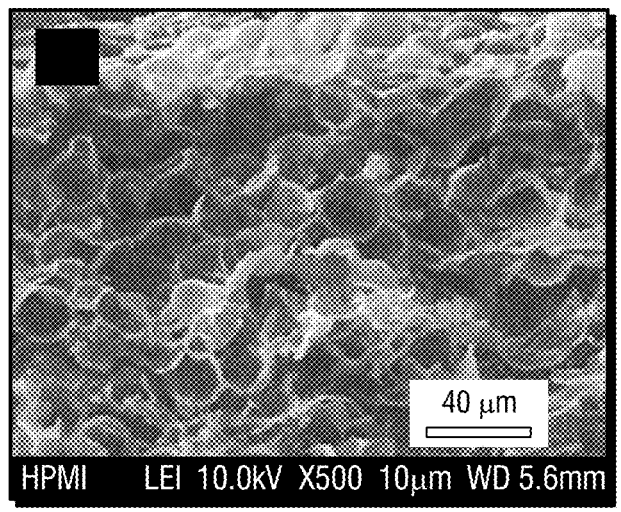
FIG. 3A is an SEM image showing the structure of a CNT foam produced with a 1:10 weight ratio of CNT to PMMA.
Figure 3B:
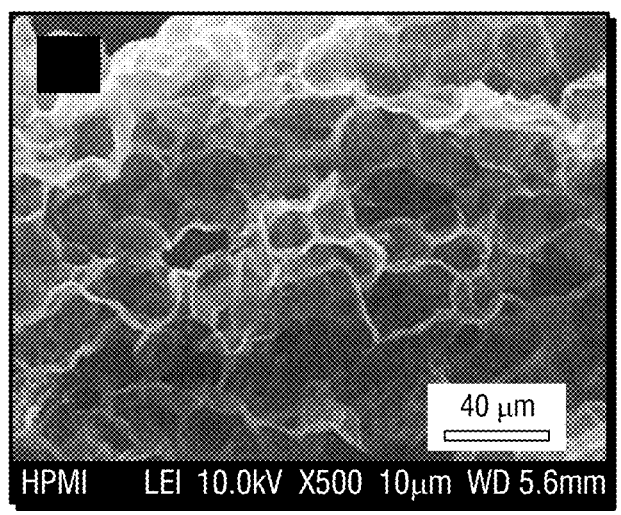
FIG. 3B is an SEM image showing the structure of a CNT foam produced with a 1:20 weight ratio of CNT to PMMA.
Figure 3C:
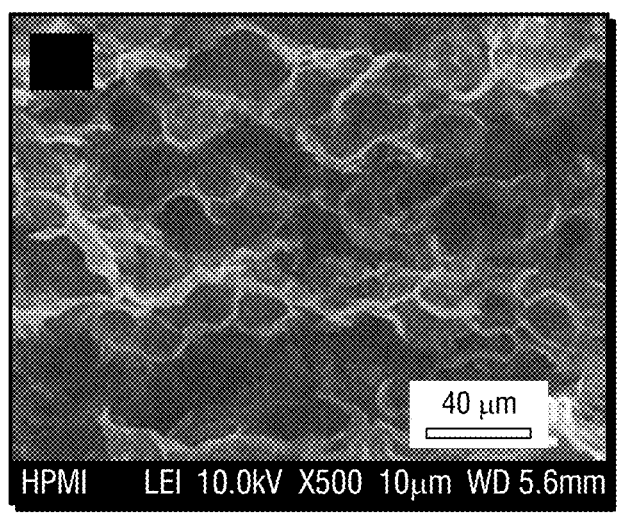
FIG. 3C is an SEM image showing the structure of a CNT foam produced with a 1:40 weight ratio of CNT to PMMA.

The CNT/polymer composite material was then subjected to thermal treatment. The thermal treatment was performed at 300° C. in air for 2 hours. FIG. 1 shows the fabrication procedure 100. The CNTs 110 were dispersed in IPA 120 be probe sonication. PMMA microspheres 130 were then added, and mixed with the CNTs. The IPA 120 was then removed to form a sample containing CNTs 110 and PMMA microspheres 130. The PMMA microspheres 130 were then removed by heat treatment to form a CNT foam 140 having micropores 150. FIG. 2 shows the SEM images of the sample using a PMMA/CNT weight ratio of 20:1 before (FIG. 2A and FIG. 2B) and after (FIG. 2C and FIG. 2D) the thermal treatment. The cells of the CNT foam were almost spherical and corresponded to the size of the PMMA microspheres. The cells—i.e., pores—distributed uniformly throughout the sample. FIG. 3 shows the CNT foam produced with PMMA/CNT weight ratios of 10:1 (FIG. 3A), 20:1 (FIG. 3B), and 40:1 (FIG. 3C). The weight ratio of PMMA to CNTs determined, in some embodiments, the porosity of the foams. It was observed that, in some embodiments, increasing the ratio of PMMA/CNT resulted in thinner cell walls (struts) and higher pore volume.

The walls of the cells in the CNT foam (i.e., the struts of the foam) were made of a random network of long and interconnected CNTs. The thickness of the cell walls was around 1 micrometer when the weight ratio of CNT to PMMA was 1:20. Because the length of the multi-walled CNTs (~500 micrometers) was more than 15 times longer than the size of a cell (~30 micrometers), the adjacent hollow capsules were connected by CNTs, which was believed to be good for the integrity of the structure. Further treatment at 1,000° C. did not adversely impact the structure of the foam.

Example 2-Preparation of CNT/Graphene Hybrid Foam

Polyacrylonitrile (PAN) was dissolved in dimethylformamide (DMF) to form a homogeneous PAN/DMF solution having a concentration of 1 weight %. The PAN/DMF solution was added to a CNT powder at a desired ratio, and then a non-solvent, isopropanol (IPA), was added in an amount effective to achieve a dispersion of the CNTs.

CNTs were then dispersed in the PAN/DMF-non-solvent liquid solution using probe sonication. PMMA spheres were then added to the CNT/PAN suspension. The mixture was subsequently stirred at 1,000 rpm for 10 minutes or sonicated in a bath sonicator for 5 minutes to reach a uniform dispersion of PMMA spheres in the CNT/PAN suspension.

The sample was then dried by placing the suspension on a hot plate (50° C.) in a hood to evaporate the DMF-non-solvent liquid. The sample was further dried in a vacuum oven at 70° C. for 12 hours to ensure complete removal of the DMF-non-solvent liquid.

Figure 4:
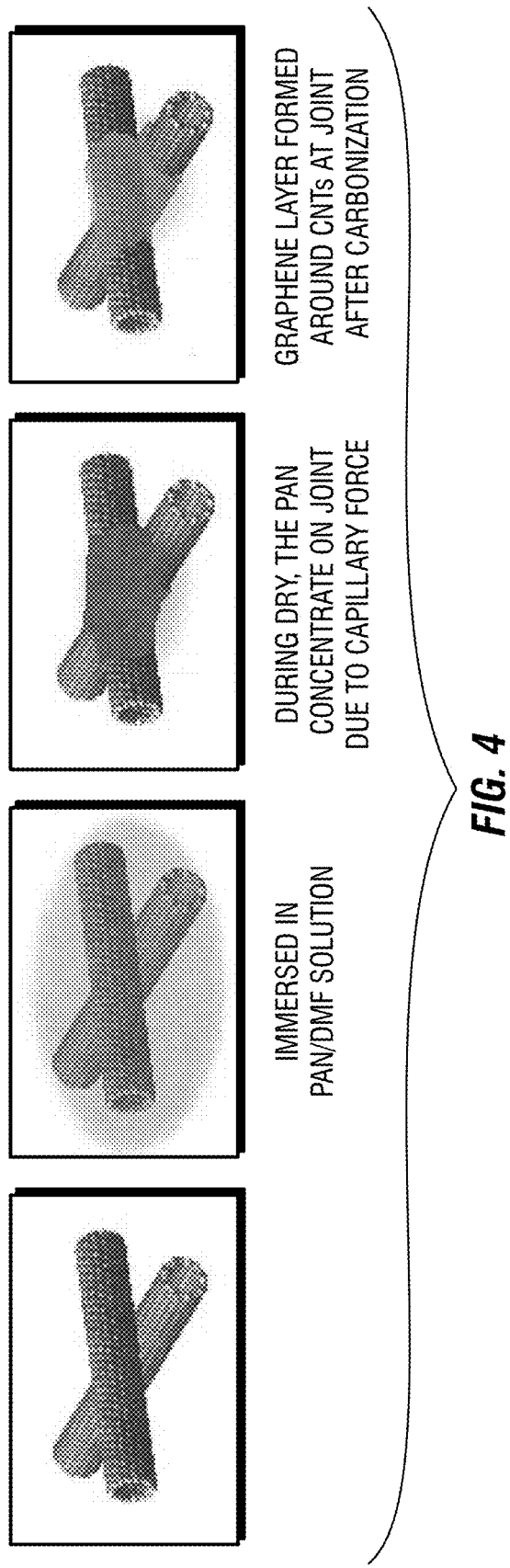
FIG. 4 schematically depicts the effect of using a carbonaceous binder precursor.

The CNT/graphene hybrid foam was obtained via a two-step heat treatment process, which was the same as the standard carbon fiber fabrication process. In the first step, the samples were heated in a tube furnace to 280° C. at 2° C./min, followed by an isothermal hold for 3 hours in air. During this step, PAN polymer was oxidized (stabilization of PAN) and the template polymer (PMMA) was removed or partially removed. In the second step, the samples were treated at 1,000° C. under 1 atm pressure in nitrogen gas with the flow rate of 80 mL/min for 1 hour. Graphene and graphene flakes were formed due to the carbonization of the stabilized PAN. The effect of the PAN is shown in FIG. 4.

Figure 5C:
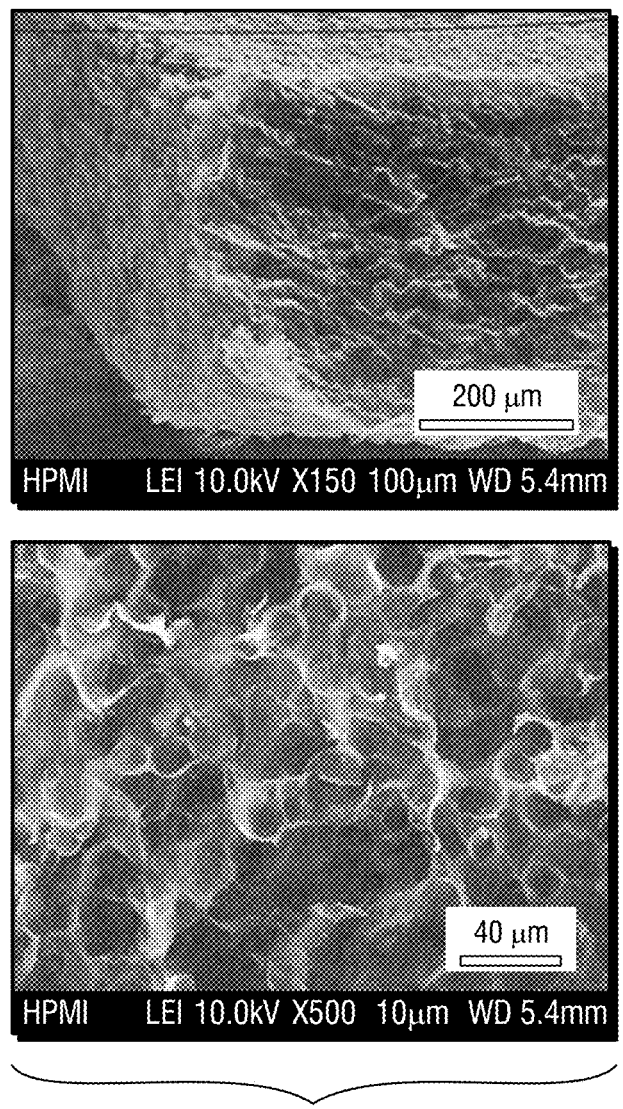
FIG. 5C includes SEM images of the sample of FIG. 5A after thermal treatment at 1,000° C. under nitrogen.
Figure 6A:
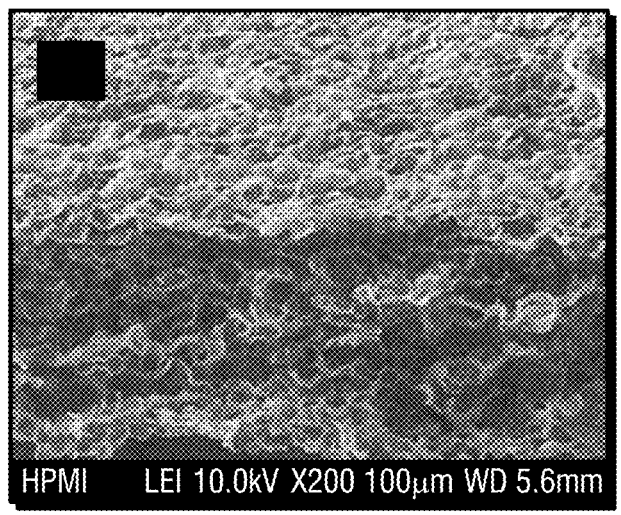
FIG. 6A is an SEM image that shows the microscale cells of one embodiment of a CNT foam.
Figure 6B:
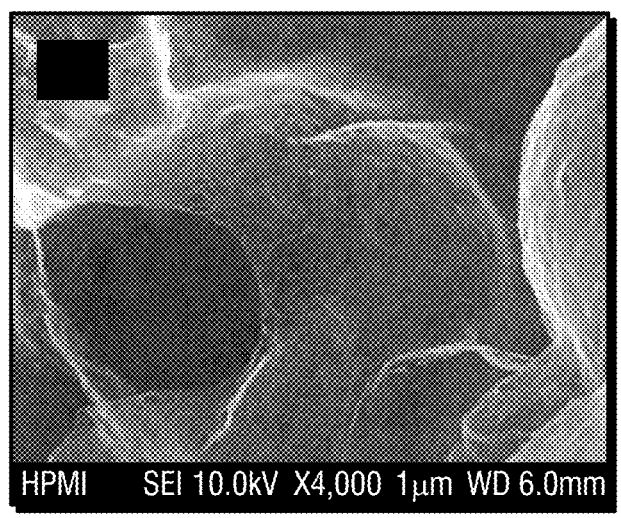
FIG. 6B is an SEM image that shows the CNTs that form the cell walls of the microscale pores of FIG. 6A.
Figure 6C:
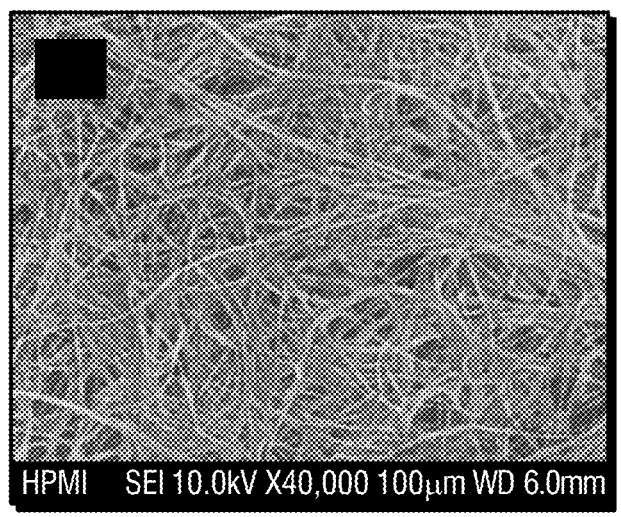
FIG. 6C is an SEM image that shows the nanoscale pores of one embodiment of a CNT foam.
Figure 7A:
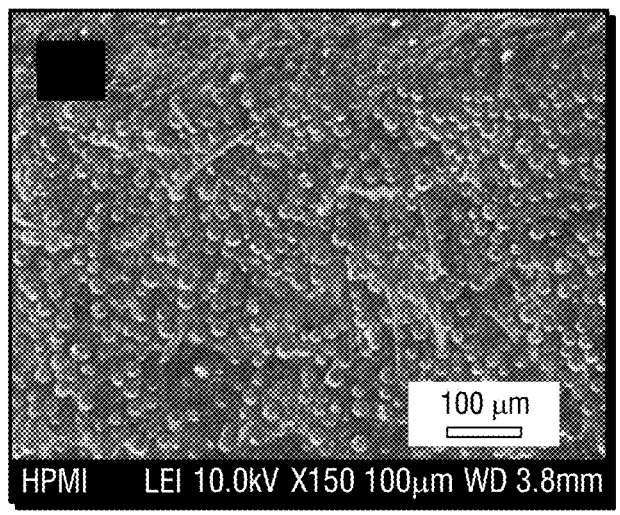
FIG. 7A is an SEM image of a sample after removal of the non-solvent, which includes CNTs, PAN (binder precursor), PMMA spheres having a size distribution of 10-27 micrometers (pyrolytic polymer), and nylon fibers having an average diameter of about 8 micrometers (pyrolytic polymer). The PAN:CNT:pyrolytic polymer weight ratio was 0.5:1:21.7.
Figure 7B:
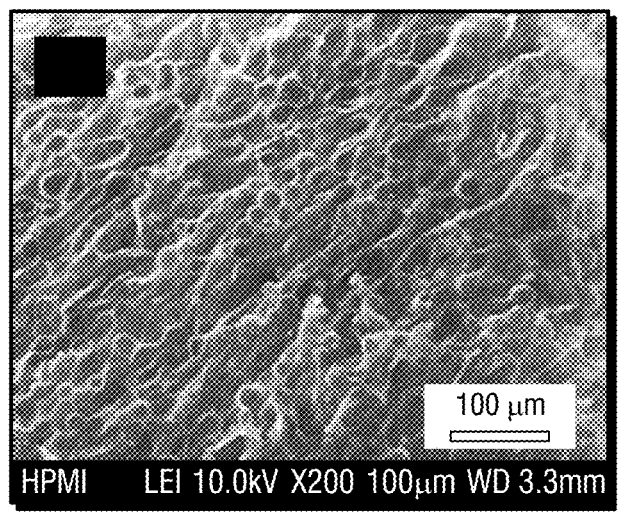
FIG. 7B is an SEM image (100 μm) of the sample of FIG. 7A after the PMMA and nylon were removed by heat treatment.
Figure 7C:
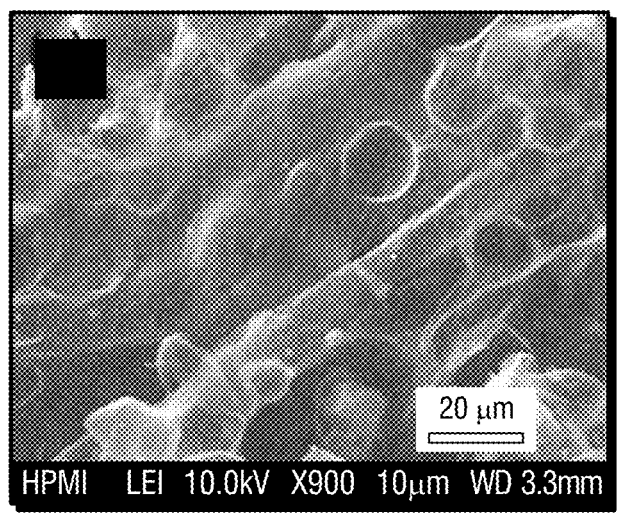
FIG. 7C is an SEM image (20 μm) of the sample of FIG. 7B at higher magnification.

The variable CNT/graphene hybrid foams were prepared by adjusting the PMMA/CNT weight ratio and the amount of PAN. FIG. 5 shows the morphology and structure of the sample with a weight ratio of PAN:CNT:PMMA of 2:1:20 before (FIG. 5A) and after 280° C. (FIG. 5B) as well as 1000° C. (FIG. 5C) heat treatments. The CNTs were multi-walled CNTs having 4-6 walls, ~8 nm in diameter, and ~500 micrometers in length. The pyrolytic polymer was PMMA microspheres that were 5-27 micrometers in diameter. In FIG. 6, the SEM images show that the foam had microscale pores (FIG. 6A), that the CNTs formed the walls of the micro-scale pores (FIG. 6B), and that the walls contained nanoscale pores (FIG. 6C). Various samples were made with different PAN:CNT:polymer ratios and different polymer particle sizes and shapes. When taking the amount of CNTs as 1, the pyrolytic polymer to CNT ratio was changed from 0 to 60 and the PAN to CNT ratio was changed from 0 to 2. FIG. 7 shows the SEM images of the foams made by two different pyrolysis polymers: one had PMMA spheres with size distribution of 10 to 27 micrometers and another had nylon fiber that was about 8 micrometers in diameter. The PAN:CNT polymer ratio was 0.5:1:21.7. The PMMA spheres, nylon fibers, and CNTs were mixed well (FIG. 7A) and the foam had sphere shaped pores and tube shaped pores after the PMMA and nylon were removed by thermal treatment (FIGS. 7B and 7C). The tube shaped pores can be used as channels for some applications.

The PAN powder had a molecular weight of 15,000 g/mol. The non-solvent liquid was IPA. The CNTs formed a random network around the PMMA spheres (FIG. 5A) and the pore size was in the tens of nanometers. After the composite was stabilized at 280° C. for 3 hours, PAN converted into a condensed heterocyclic ring structure. At the same time, the PMMA spheres depolymerized into oligomers. Generally, the cross section of the oligomers was approximately 1 nm, which was smaller than the nanopores formed by entangled CNTs. Therefore, the oligomers were readily expelled from the composite through the nanopores of the CNT network. Eventually, the PMMA spheres were removed. As the original size of the PMMA spheres was preserved, cells were formed at the previous sites of the PMMA spheres in the composite as shown in FIG. 5B. After over 1000° C. thermal treatment, the foam structure was maintained and graphitic structures, including graphene and graphene flakes, formed among and around the CNTs (FIG. 5C).

Example 3-Properties of CNT Foams

It is believed that the mechanical properties of the CNT foams originated from the bending modulus of CNTs or entanglements between them. Most of the CNT foams may have relied on van der Waals forces at CNT-CNT junctions. To fabricate cellular solids, which are strong, robust, and have a large surface area, the CNT joints needed to be reinforced. Generally, polymers were utilized to reinforce the structural integrity of the CNT-based porous network.

Figure 8A:
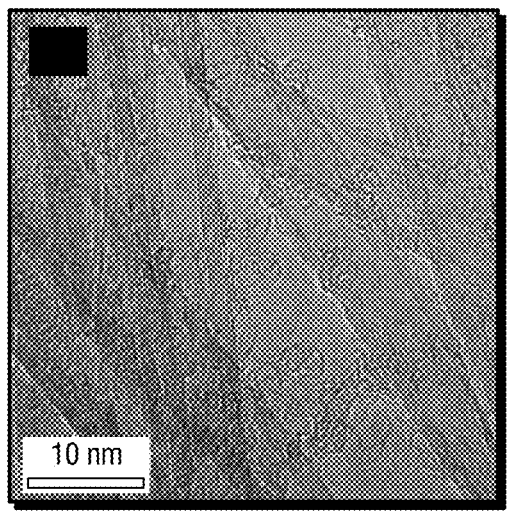
FIG. 8A is a TEM image of a CNT foam and the cross-links among CNTs created by a relatively lower addition of PAN.
Figure 8B:
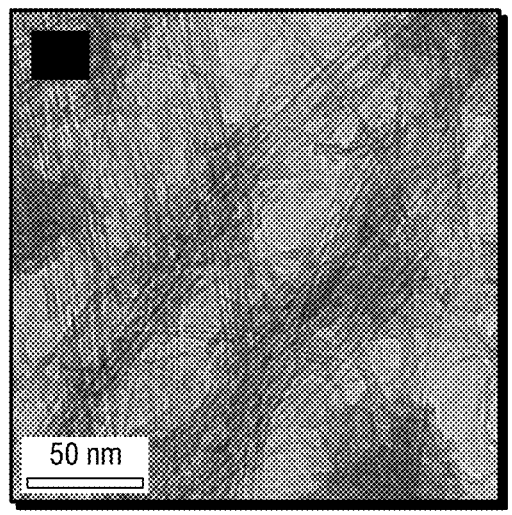
FIG. 8B is a TEM image of a CNT foam and the graphene flakes around the CNTs created by a relatively higher addition of PAN.

In one example, PAN was used to reinforce the CNT network by locking the contacted CNTs and generating connections between CNTs because PAN can be carbonized to form strong C—C bonding when treated in an inert gas at 1,000° C. The effect of PAN was evaluated by using thin CNT sheets. FIG. 8A and FIG. 8B show the TEM images of the CNTs connected by graphene flakes when the concentration of the PAN/DMF solution was 1 mg/mL and 2 mg/mL, respectively.

The TEM images revealed that the PAN polymer changed into graphitic structures after the carbonization. The graphitic structures accumulated at the joints between CNTs because the PAN precursors were mainly concentrated on the CNT joints by strong capillary forces during evaporation of DMF. Meanwhile, some of the CNTs surfaces were also coated with graphitic structures. When the concentration of PAN/DMF solution was increased to 2 mg/mL, a layer of PAN was uniformly coated on the CNTs' surfaces.

Consequently, all the surfaces of the CNTs were coated by graphene and graphene flakes after carbonization (FIG. 8B). The graphitic structures, like a jacket, "locked" the CNTs. The sliding of CNTs was confirmed by the jacket under high loading to dissipate energy. Since the nanotubes in the CNT foam were long and one nanotube belonged to many joints, the "locking" and sliding increased the robustness of the CNT foam. The PAN enhancement did not affect the structural integrity of the CNT foam or the porosity of the nanotube network. It is believed that these graphitic structures enhanced the structure robustness, improved the conductivity, and increased the surface area of the foam.

Figure 9:
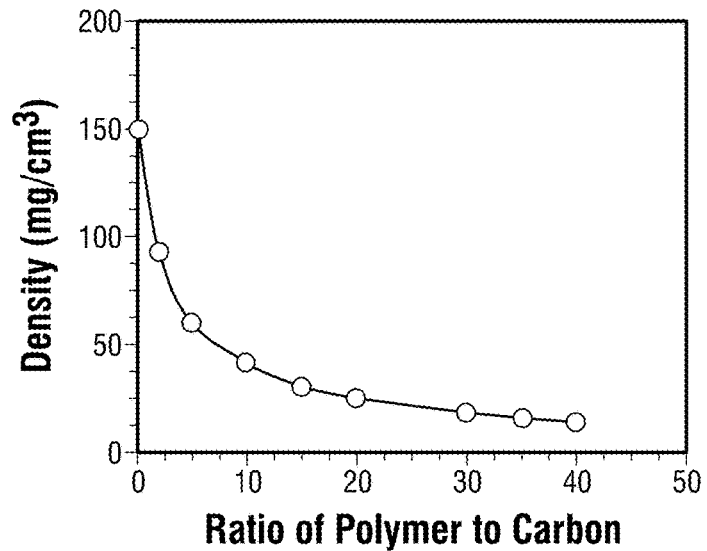
FIG. 9 shows the density of the samples made with different pyrolytic polymer to carbon weight ratios; "carbon" in this figure refers to CNTs plus any carbon converted from a carbonaceous binder.
Figure 10A:
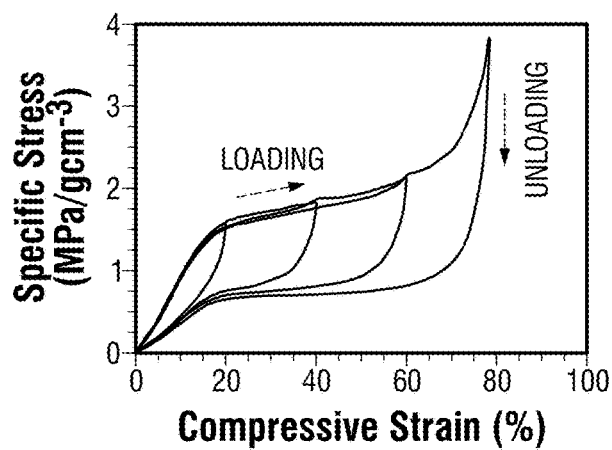
FIG. 10A shows a compressive stress-strain curve of a CNT/graphene hybrid foam (pore size about 30 micrometers, density of 20 mg/cm$^3$).
Figure 10B:
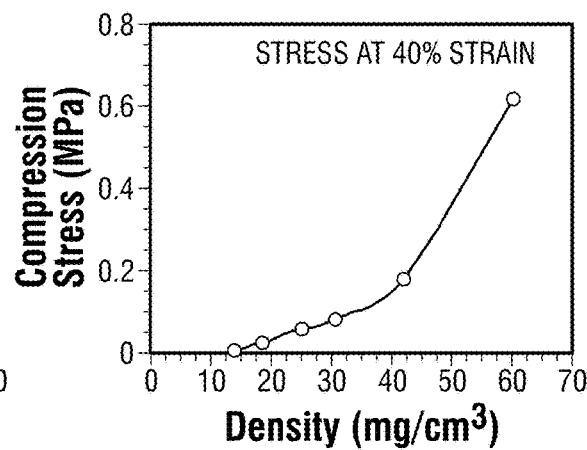
FIG. 10B shows the relationship between density and the compressive stress of a CNT/graphene hybrid foam.

FIG. 9 shows the density of the samples made with different CNT/PMMA weight ratios. FIG. 10 shows the compressive stress-strain (FIG. 10A) curve of a CNT/graphene hybrid foam (pore size of about 30 micrometers, density of 20 mg/cm$^3$), and the relationship between stress and density (FIG. 10B). The foam was superelastic; it completely recovered from 80% deformation. After aging, the foam had good repeatability.

Figure 11:
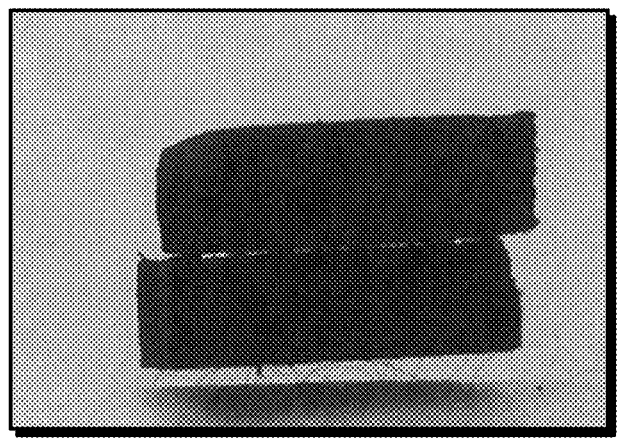
FIG. 11 is a photo that depicts two CNT foam monoliths being supported by a few fine fibers. The density of the CNT foam shown in this figure was 12 mg/cm$^3$.
Figure 12:
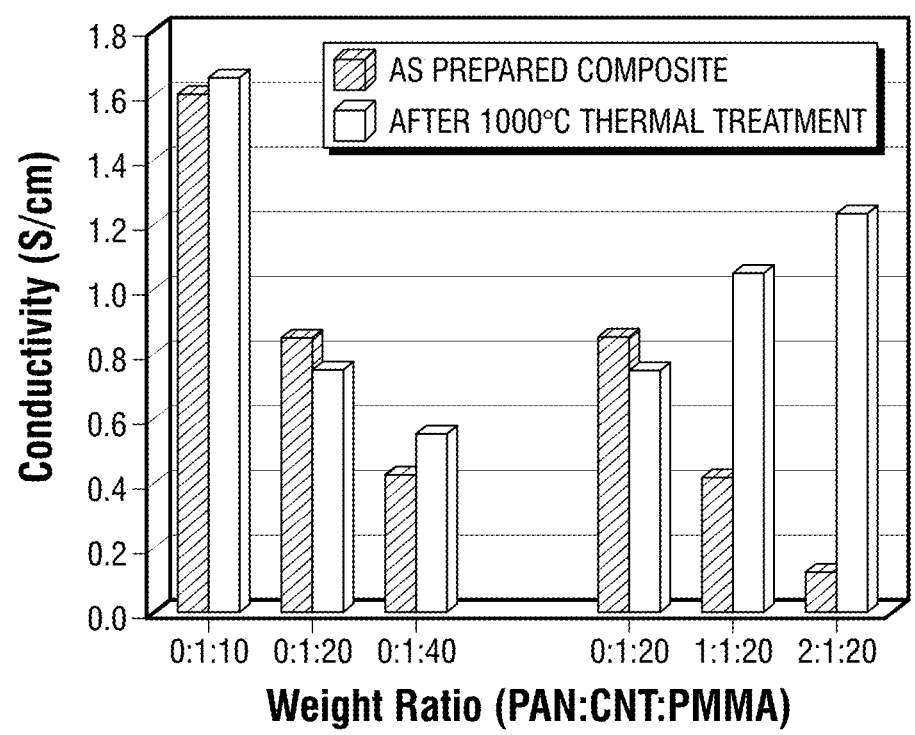
FIG. 12 shows the conductivity of foams made with different CNT/PMMA weight ratios and PAN/CNT/PMMA weight ratios before and after thermal treatments.
Figure 13A:
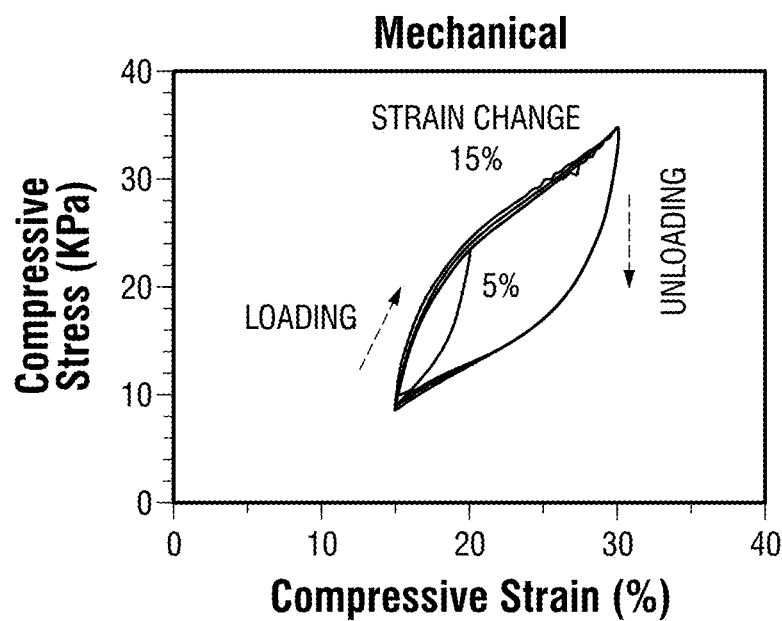
FIG. 13A depicts the mechanical responses to the cyclical deformation of the foam.
Figure 13B:
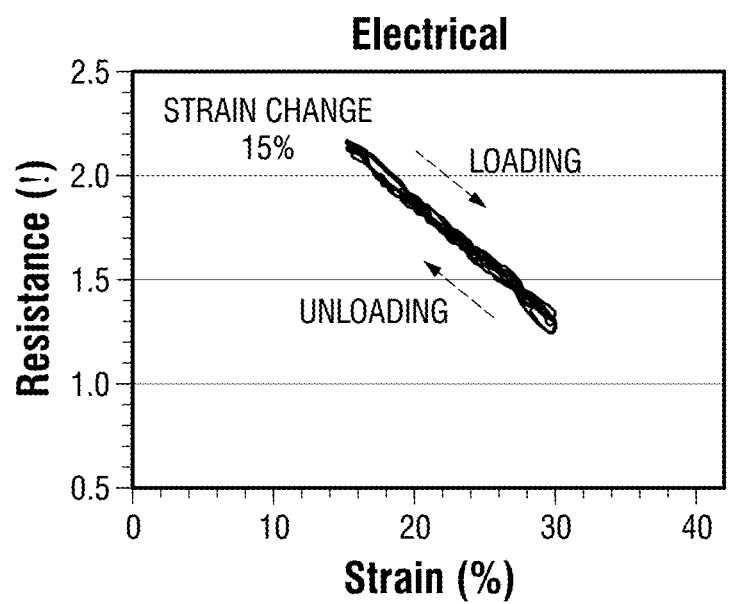
FIG. 13B depicts the electrical responses to the cyclical deformation of the foam.

FIG. 11 shows that two monoliths of the CNT foam with a density of 12 mg/cm$^3$ were supported by a few fine fibers. FIG. 12 shows the electric conductivity of the foam made with different CNT/PMMA weight ratios and PAN/CNT/PMMA weight ratios before (left column) and after (right column) thermal treatments. FIG. 13A and FIG. 13B depict the mechanical (FIG. 13A) and electrical (FIG. 13B) responses to the cyclical deformation of the foam. The foam of this example demonstrated viscoelastic behavior mechanically and linear resistive behavior under compressive deformation.

Figure 14A:
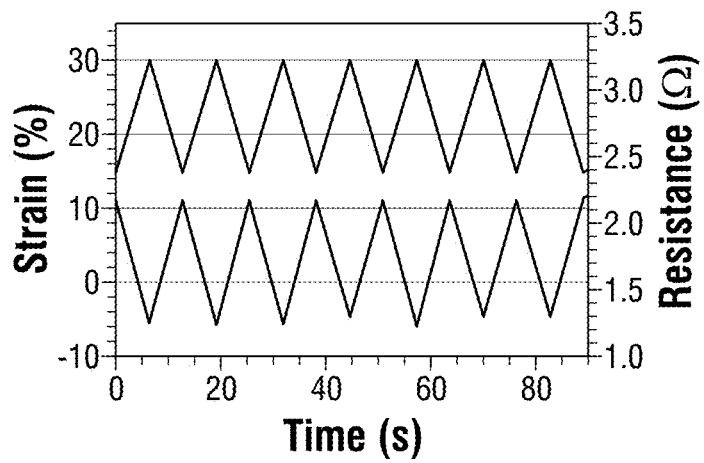
FIG. 14A depicts the resistance response to 15% strain change of a CNT/graphene hybrid foam having a pore size about 20 micrometers, and a density of 13 mg/cm$^3$ in triangle waveform.
Figure 14B:
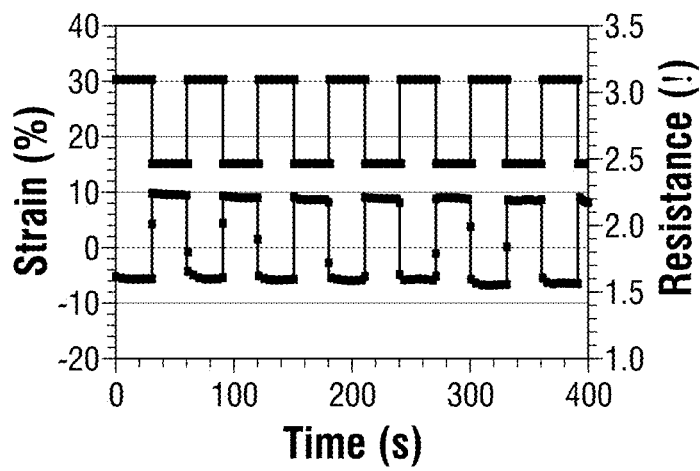
FIG. 14B depicts the resistance response to 15% strain change of a CNT/graphene hybrid foam having a pore size about 20 micrometers, and a density of 13 mg/cm$^3$ in rectangular waveform.
Figure 14C:
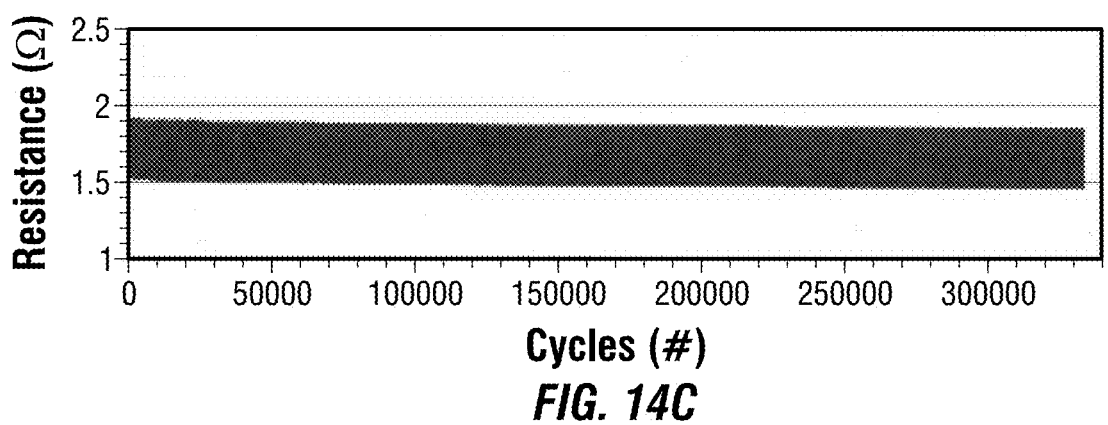
FIG. 14C depicts the reliability of a CNT foam under 15%-30% strain cycles; the CNT foam of this embodiment survived at least 350,000 cycles as shown in the graph.
Figure 15:
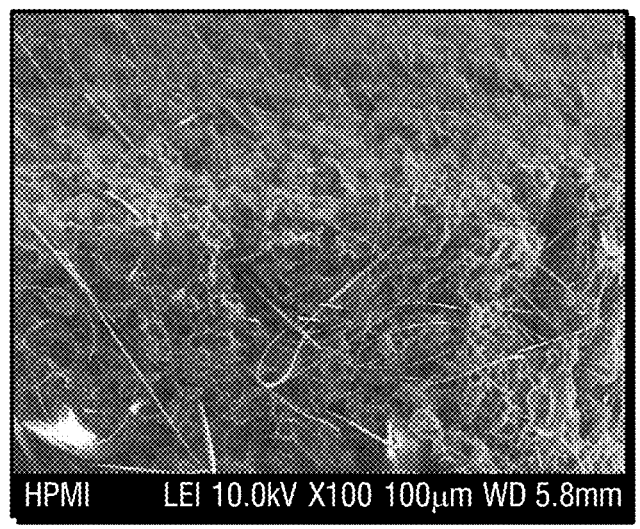
FIG. 15 is an SEM image of a carbon fiber reinforced CNT hybrid foam.

FIG. 14 depicts the resistance response to 15% strain change of a CNT/graphene hybrid foam having a pore size about 20 micrometers, and a density of 13 mg/cm$^3$. FIG. 14A and FIG. 14B depict the strain change in triangle waveform and rectangular waveform, respectively. The response time was less than 0.2 seconds. FIG. 14C depicts the reliability of the foam under 15%-30% strain cycles. The foam could survive at least 350,000 cycles as shown in the graph. FIG. 15 is an SEM image of a carbon fiber reinforced CNT hybrid foam. The carbon fibers (diameter 7 micrometers) were added into the CNT suspension before the composite was made.

Other aspects, embodiments, modifications, and equivalents thereof which, after reading the description herein, may suggest themselves to one or ordinary skill in the art without departing from the spirit of the present invention or the scope of the appended claims.

I claim:

1. A method for making a carbon nanotube (CNT) foam, the method comprising:
   forming a suspension comprising a non-solvent liquid in which CNTs and particles of a pyrolytic polymer are dispersed;
   removing the non-solvent liquid; and
   removing the particles of the pyrolytic polymer to produce a CNT foam having cells that at least substantially correspond to the dimensions of the particles of the pyrolytic polymer.

2. The method of claim 1, wherein forming the suspension comprises (i) dispersing CNTs in the non-solvent liquid to form a CNT suspension, and (ii) adding the particles of the pyrolytic polymer to the CNT suspension.

3. The method of claim 1, wherein the pyrolytic polymer comprises a thermoplastic polymer.

4. The method of claim 3, wherein the thermoplastic polymer comprises poly(methylmethacrylate), nylon, polyesters, or a combination thereof.

5. The method of claim 1, wherein the particles of the pyrolytic polymer have an average diameter of from about 0.1 micrometers to about 1,000 micrometers.

6. The method of claim 1, wherein the average length of the CNTs is at least two times the average diameter of the particles of the pyrolytic polymer.

7. The method of claim 1, wherein the average length of the CNTs is at least fifteen times the average diameter of the particles of the pyrolytic polymer.

8. The method of claim 7, wherein the average length of the CNTs is about 500 micrometers and the average diameter of the particles of the pyrolytic polymer is about 30 micrometers.

9. The method of claim 1, wherein the particles of the pyrolytic polymer are at least substantially spherical.

10. The method of claim 1, wherein the weight ratio of pyrolytic polymer to CNTs in the suspension ranges from about 1:1 to about 60:1.

11. The method of claim 1, wherein removing the particles of the pyrolytic polymer comprises a first heat treatment at a temperature effective to pyrolyze and evaporate the particles of the pyrolytic polymer.

12. The method of claim 1, further comprising adding a carbonaceous binder precursor to the suspension prior to removing the non-solvent liquid, and converting the carbonaceous binder precursor to graphitic structures after removing the non-solvent liquid.

13. The method of claim 12, wherein converting the carbonaceous binder precursor to graphitic structures comprises a second heat treatment.

14. The method of claim 13, wherein the second heat treatment comprises heating the CNT foam to at least 800° C.

15. The method of claim 12, wherein the weight ratio of carbonaceous binder precursor to CNTs in the suspension ranges from about 0.1:1 to about 5:1.

16. The method of claim 12, wherein the carbonaceous binder precursor is selected from polyacrylonitrile, pitch, or a combination thereof.

17. A method for making a carbon nanotube (CNT) foam, the method comprising:

forming a suspension comprising a non-solvent liquid in which CNTs, particles of a pyrolytic polymer, and a carbonaceous binder precursor are dispersed;
removing the non-solvent liquid;
removing the particles of the pyrolytic polymer to produce a CNT foam having cells that at least substantially correspond to the dimensions of the particles of the pyrolytic polymer; and
converting the carbonaceous binder precursor to graphitic structures.

* * * * *